(12) United States Patent
Rule et al.

(10) Patent No.: US 10,776,775 B1
(45) Date of Patent: Sep. 15, 2020

(54) NFC ENABLED CARD FOR CONSUMER ACCESSIBILITY

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/600,618

(22) Filed: Oct. 14, 2019

(51) Int. Cl.
| | | |
|---|---|---|
| G06K 5/00 | (2006.01) | |
| G06Q 20/34 | (2012.01) | |
| G06Q 20/10 | (2012.01) | |
| G09B 21/00 | (2006.01) | |

(52) U.S. Cl.
CPC ....... *G06Q 20/346* (2013.01); *G06Q 20/1085* (2013.01); *G06Q 20/3552* (2013.01); *G06Q 20/3563* (2013.01); *G09B 21/00* (2013.01)

(58) Field of Classification Search
CPC ........ G07F 7/1008; G07F 7/08; G06Q 20/341
USPC ....................................................... 235/380
See application file for complete search history.

(56) References Cited

U.S. PATENT DOCUMENTS

| | | | |
|---|---|---|---|
| 5,616,901 A | 4/1997 | Crandall et al. | |
| 5,901,874 A | 5/1999 | Deters | |
| 6,049,328 A | 4/2000 | Vanderheiden | |
| 6,061,666 A | 5/2000 | Do et al. | |
| 7,175,076 B1 | 2/2007 | Block et al. | |
| 7,453,439 B1 | 11/2008 | Kushler et al. | |
| 7,644,039 B1* | 1/2010 | Magee | G06Q 20/1085 |
| | | | 221/9 |
| 8,723,941 B1* | 5/2014 | Shirbabadi | G07F 19/205 |
| | | | 348/78 |
| 10,521,046 B2* | 12/2019 | Klein | G09B 21/004 |
| 2005/0211784 A1* | 9/2005 | Justin | G06K 19/0718 |
| | | | 235/492 |
| 2006/0280388 A1 | 12/2006 | Rabb | |
| 2008/0014867 A1 | 1/2008 | Finn | |
| 2008/0197201 A1* | 8/2008 | Manessis | G06Q 20/10 |
| | | | 235/492 |
| 2013/0065564 A1 | 3/2013 | Conner et al. | |
| 2013/0314593 A1 | 11/2013 | Reznik et al. | |

(Continued)

*Primary Examiner* — Ahshik Kim
(74) *Attorney, Agent, or Firm* — Hunton Andrews Kurth LLP

(57) ABSTRACT

A contactless card useful for adjusting the operation, configuration, and/or performance of a secondary device is described. The contactless card is equipped with a communication interface which allows the contactless card to transmit information to the secondary device using NFC signals. The contactless card stores accommodation information related to a physical accommodation desired by the user and transmits that information in the form of an accommodation message to the secondary device after being placed in a NFC field generated by the secondary device. In some embodiments, the contactless card requests an authentication certificate in order to determine a degree of trust prior to sending an accommodation message. In some embodiments, the contactless card may adjust what accommodation information is included in the accommodation message based on the authentication certificate received from the secondary device.

20 Claims, 6 Drawing Sheets

(56) References Cited

U.S. PATENT DOCUMENTS

2016/0104140 A1* 4/2016 Harrow ................ G06Q 20/18
                                                    705/42
2017/0316696 A1  11/2017 Bartel
2018/0012207 A1*  1/2018 Cardinal ............ G06Q 20/1085
2019/0130376 A1*  5/2019 Hamilton ............... G06Q 20/18

* cited by examiner

605 PROVIDING A CARD

610 TAPPING THE CARD TO A SECONDARY DEVICE

615 REQUESTING AN AUTHENTICATION CERTIFICATE

620 SELECTING ACCOMMODATION INFORMATION TO TRANSMIT

625 LIMITING THE STRENGTH OF A TRANSMITTED SIGNAL

630 TRANSMITTING ACCOMMODATION INFORMATION

635 ADJUSTING THE SECONDARY DEVICE

640 AUTO-FILLING A FORM

645 NOTIFYING A THIRD DEVICE

650 LOWERING THE HEIGHT OF AN INPUT DEVICE

655 INCREASING FONT SIZE

NFC ENABLED CARD FOR CONSUMER ACCESSIBILITY

FIELD OF THE INVENTION

This disclosure relates to a contactless card configured to alter the behavior of secondary devices including automatic teller machines.

BACKGROUND

Communication using a contactless card is useful in many applications. These applications primarily relate to the transfer of digital information with little to no impact on the physical world impacting a user. Additionally, the use of contactless cards often requires interaction with devices or equipment which may not be accessible to users who do not have complete or conventional use of their bodies and/or senses.

The use of devices, such as automatic teller machines (ATMs), may be difficult for users who use wheelchairs, users who have limited vision, users with tremors or other physical disabilities. For example, conventional ATM designs may prevent a user in a wheelchair from being able to position himself or herself close enough to the ATM to reach the buttons and/or screen necessary to operate the ATM. Additionally, users with tremors may not be able to utilize a touch screen without accidentally touching unintended portions of the screen. Some users with limited range of motion may not be able to raise their arm to the necessary height to interact with conventional ATMs. These are just a few of the ways in which users with limited use of their bodies and/or senses are prevented from utilizing ATMs as well as a wide variety of other devices.

While some devices, such as ATMs and mobile devices, are equipped with various accessibility settings, it may be prohibitively difficult to activate those settings. For example, a user with limited vision may be unable to navigate the necessary commands and settings in order to activate the feature of voice commands. However, until voice commands have been activated, the user with limited vision may be unable to utilize the device.

These and other deficiencies exist, and accordingly, there is a need for a contactless card which is configured to communicate with a secondary device in order to transmit accommodation information which facilitates the use of the device by a user. By allowing a user to communicate with a secondary device and adjust the settings and/or configuration of a secondary device using a contactless card, users who would otherwise be unable to utilize a secondary device are more able to do so.

SUMMARY

It is an object of this disclosure to describe a contactless card that is able to communicate accommodation information associated with a user using near-field communication (NFC), Bluetooth, or other contactless communication signals to a secondary device.

It is a further object of this disclosure to describe a secondary device which is designed to reconfigure its physical form and/or settings in order to accommodate users who desire an accommodation.

Embodiments of the present disclosure provide a system comprising: a contactless card comprising a processor, a memory, and a contactless communication interface, wherein the memory contains an applet and physical accommodation information associated with one or more physical accommodations, wherein, after entry of the contactless card into a contactless communication field generated by a secondary device, the applet is configured to: request an authentication certificate from the secondary device via the contactless communication interface of the contactless card, and upon receipt of the authentication certificate, generate an accommodation message based on the physical accommodation information for transmission to the secondary device via a contactless communication interface of the secondary device, wherein, upon receipt of the accommodation message, the secondary device is configured to perform at least one accommodation action.

Embodiments of the present disclosure provide a method for implementing accommodations comprising: detecting, by a secondary device, entry of a card into a contactless communication field, wherein the card comprises a processor, a memory containing accommodation information associated with a user's preferred accommodations, and a communication interface; receiving, by the secondary device, accommodation information from the card via the contactless communication field; and adjusting, by the secondary device, a configuration of the secondary device in response to the received accommodation information.

Embodiments of the present disclosure provide a contactless card comprising: a processor; a memory containing an applet and physical accommodation information; a contactless communication interface, wherein the contactless communication interface is configured to establish contactless communication with a secondary device that is configured to perform one or more accommodative actions, wherein, upon establishing contactless communication with the secondary device, the applet is configured to generate an accommodation message based on the physical accommodation information for transmission to the secondary device via the contactless communication interface, and wherein the applet is configured to encrypt the accommodation message prior to transmission to the secondary device.

Further features of the disclosed designs, and the advantages offered thereby, are explained in greater detail hereinafter with reference to specific example embodiments illustrated in the accompanying drawings.

BRIEF DESCRIPTION OF THE DRAWINGS

FIG. 6 illustrates a flow chart of a method for accommodating a user based on an authentication certificate from a secondary device according to an example embodiment.

DETAILED DESCRIPTION OF EXEMPLARY EMBODIMENTS

Figure 1:
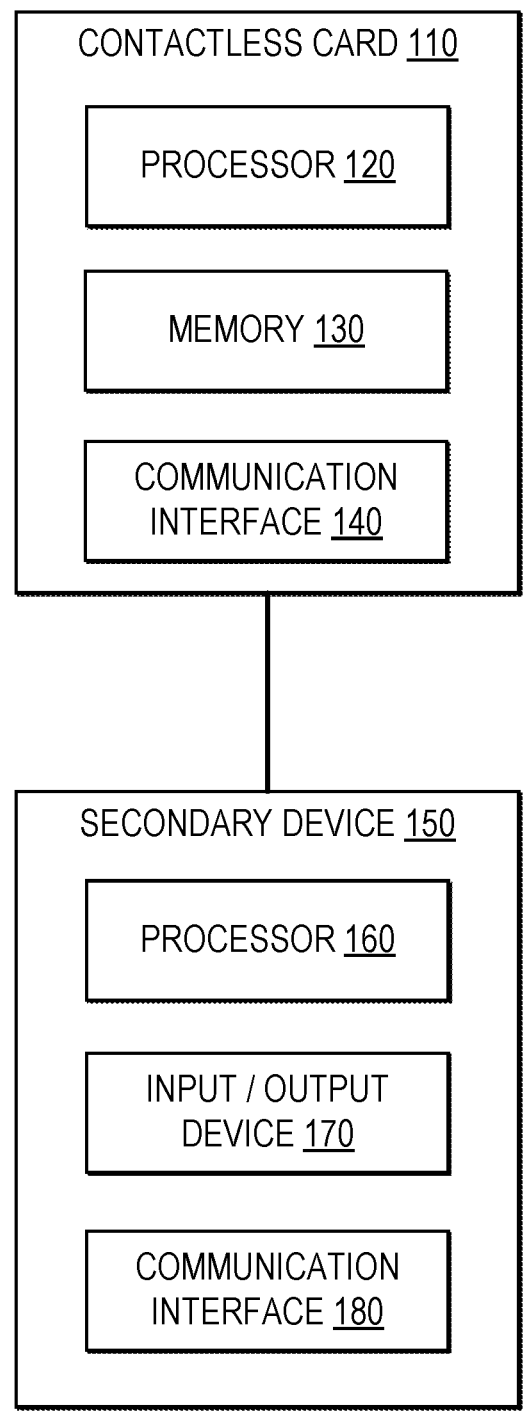
FIG. 1 illustrates a physical accommodation system utilizing a contactless card according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention By employing a contactless communication interface, a contactless card may be provided with a method to interact and communicate with a secondary device such as, for example, an ATM, mobile device, kiosk, computer, or smart phone. Communication between a contactless card and secondary device may include, for example, the EMV protocol, which underlies many credit card transactions, includes an authentication process.

In some embodiments, a contactless card may be used by users who desire some form of accommodation to facilitate use of a secondary device. For example, a user who is in a wheelchair may wish to use an ATM, but the physical configuration of the ATM may not allow the user to easily reach the controls necessary to operate the ATM. A user in a wheelchair may not be able to reach high enough to operate the ATM or the body of the ATM may prevent a user in a wheelchair from getting close enough to reach the ATM controls.

In some embodiments, the user may be able to position a contactless card into a contactless communication field, such as, for example, an NFC field, generated by the ATM, thereby establishing communication between the ATM and contactless card. The contactless card can transmit accommodation information stored in the memory of the contactless card to the ATM thereby prompting the ATM to adjust its settings in order to accommodate the user though an accommodation action. In some exemplary embodiments, the ATM is designed to lower or reconfigure the necessary controls so that a user in a wheel chair can more easily operate the ATM. In some embodiments, the ATM may adjust the font size, contrast, color settings, and/or screen brightness in order to accommodate a user with limited vision. In some embodiments, the ATM may activate a microphone, activate speakers, activate voice commands, activate a screen reader, and/or increase the volume. In some embodiments, the ATM may utilize a touch screen as an input/output device. In some embodiments, the virtual buttons of the touch screen may be increased in size and/or require a prolonged touch in order to activate in order to accommodate users with tremors and/or limited mobility. In some embodiments, the touch screen may ignore short duration or light contact touches.

In other examples, a user with limited vision may wish to use a mobile device, such as, for example, a smart phone but may be unable to distinguish the features necessary to operate the mobile device. In some embodiments, the user may position a contactless card within an NFC field generated by the mobile device, thereby establishing communication between the mobile device and contactless card. The contactless card may transmit accommodation information to the mobile device thereby prompting the mobile device to, for example, increase screen brightness, increase contrast, modify the color settings, activate a screen reader, and/or activate voice commands, thereby allowing the user to operate the mobile device.

The use of NFC or other short range contactless communication to transmit accommodation information to a secondary device allows users who may have limited vision, hearing impairment, limited mobility, or other handicaps to interact with secondary devices in a manner more suited to the individual user. An individual who uses a wheelchair may have difficulty operating a conventional ATM which is configured to be utilized by a standing adult but could utilize the ATM if an input device were lowered to a more appropriate height. An individual with limited vision may have trouble seeing display screens but could interact with a secondary device if voice commands were activated. A user with impaired hearing may be unable to place an order using a voice activated kiosk, but would be able to use the device if a teletype were made available. A user with tremors may be unable to reliable type or press small buttons but could use a contactless card to transmit information to a secondary device and autofill common forms or fields. By gesturing with a contactless card in the NFC field of a secondary device, a user is able to transmit accommodation information to a secondary device which may perform an accommodation action, thereby allowing the user to more easily interact with these devices. Because the NFC field may encompass a broad area surrounding a secondary device, the user is not required to perform a detailed or precise motion such as inserting a card into a card reader or pressing a series of small buttons. Many users, including those with handicaps, are able to gesture with a contactless card in the NFC field of a secondary device and transmit information as described herein.

It is understood that the exemplary accommodation actions presented herein are for illustrations sake. While embodiments are often described in the context of an ATM, an ordinary artisan will understand that the disclosed contactless card may be used to modify the operation, performance, and/or configuration of kiosks, computers, and/or smart phones, and other fixed or mobile devices.

FIG. 1 illustrates an example embodiments of a physical accommodation system 100 utilizing a contactless card 110 and a secondary device 150. As further discussed below, system 100 may include a contactless card 110 comprising a processor 120, a memory 130, and a contactless communication interface 140. FIG. 1 further illustrates an exemplary embodiment of secondary device 150 comprising a processor 160, an input/output device 170, and a contactless communication interface 180.

Figure 2:
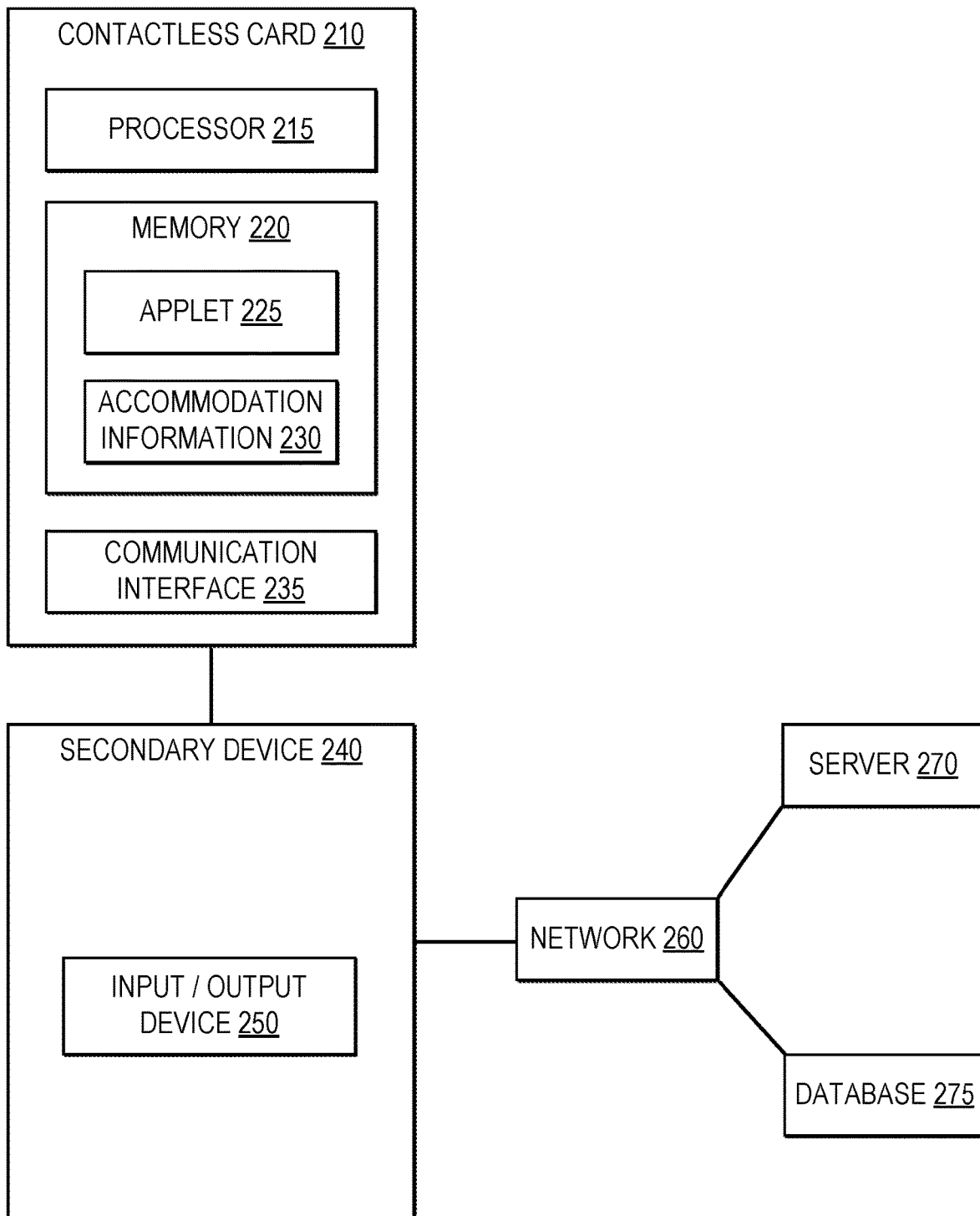
FIG. 2 illustrates a physical accommodation system utilizing a contactless card and secondary device in communication with a server and database according to an example embodiment.

FIG. 2 illustrates an example embodiment of a physical accommodation system 200. As shown in FIG. 2, in some embodiments, the contactless card 210 contains a processor 215, memory 220, and communication interface 235. In some embodiments, memory 220 contains one or more applets 225 for communicating with the secondary device 240 and transmitting accommodation information 230.

As shown in FIG. 2, secondary device 240 may comprise a processor 240, input/output device 250, and communication interface 255. In some embodiments, secondary device 240 may use a network 260 to communicate with a remote server 270 and/or database 275.

Although FIG. 2 illustrates a single instantiation of the components, embodiments of the disclosed system may include any number of components. In some examples, a contactless card may be in wireless communication, for example NFC or Bluetooth communication, with a secondary device.

In some embodiments, a secondary device may be a network-enabled computer. As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client, a fat client, an Internet browser, or other device. Secondary device also may be a mobile device; for example, a mobile device may include an iPhone, iPod, iPad from Apple® or any other mobile device running Apple's iOS operating system, any device running Microsoft's Windows® Mobile operating system, and/or any other smartphone or like wearable mobile device. Secondary device may also be a kiosk including, but not limited to a check-in kiosk for hotels, airports, train stations, and/or bus stations, a security kiosk for accessing restricted areas, a vending machine for the sale of products, or a payment kiosk for purchasing items. The secondary device may also be an ATM or other device for making financial transactions.

In various examples according to the present disclosure, secondary device may execute one or more applications, such as software applications, that enable, for example, network communications with one or more components of the disclosed system and transmit and/or receive data.

As shown in FIG. 2, in some embodiments, contactless card 210 may be in communication with secondary device 240 and in some exemplary embodiments, secondary device 240 may be in communication with one or more servers 270 via one or more networks 260, and may operate as a respective front-end to back-end pair with server 270. In some embodiments, secondary device 240 may transmit one or more requests to server 270. The one or more requests may be associated with retrieving data from server 270 and or database 275. The data may be associated with a user, an authentication certificate, an authentication message, and/or an accommodation action. Server 270 may receive the one or more requests from secondary device 240. Based on the one or more requests from secondary device 240, server 270 may be configured to retrieve the requested data from one or more databases 275. Based on receipt of the requested data from the one or more databases, server 270 may be configured to transmit the received data to secondary device 240, the received data being responsive to one or more requests.

In some embodiments, the disclosed system may include one or more networks. In some examples, a network may be one or more of a wireless network, a wired network or any combination of wireless network and wired network, and may be configured to connect a secondary device to a server. For example, a network may include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MIMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, a network may include, without limitation, telephone lines, fiber optics, IEEE Ethernet 902.3, a wide area network (WAN), a wireless personal area network, a local area network (LAN), or a global network such as the Internet. In addition, network may support an Internet network, a wireless communication network, a cellular network, or the like, or any combination thereof. A network may further include one network, or any number of the exemplary types of networks mentioned above, operating as a stand-alone network or in cooperation with each other. A network may utilize one or more protocols of one or more network elements to which they are communicatively coupled. A network may translate to or from other protocols to one or more protocols of network devices.

Although in FIG. 2, the network 260 is depicted as a single network, it should be appreciated that according to one or more examples, a network may comprise a plurality of interconnected networks, such as, for example, the Internet, a service provider's network, a cable television network, corporate networks, such as credit card association networks, and home networks.

The disclosed system may include one or more servers. In some examples, a server may include one or more processors, which are coupled to memory. A server may be configured as a central system, server or platform to control and call various data at different times to execute a plurality of workflow actions. A server may be configured to connect to the one or more databases. A server may be connected to at least one secondary device.

In some examples, a contactless card may be in wireless communication, for example NFC communication, with a secondary device. In some embodiments, a contactless card may communicate with secondary device through other techniques including, but not limited to, Bluetooth, Bluetooth LE, satellite, WiFi, wired communications, and/or any combination of wireless and wired connections. According to some embodiments, a contactless card may be configured to communicate with the card reader of a secondary device through NFC or Bluetooth signals when the contactless card is within range of the card reader. In other examples, communications with a contactless card may be accomplished through a physical interface, e.g., a universal serial bus interface, contact pad, or a card swipe interface. In some examples, the contactless card comprises a display such as, for example, an e-ink or LCD display. In such embodiments, the contactless card may be configured to display a computer readable code, such as, for example, a QR code which may be scanned by a secondary device. The contactless card may be configured to communicate with a secondary device via the disclosed computer readable code.

In some embodiments, the disclosed contactless card is a payment card, such as a credit card, debit card, or gift card. Information related to the issuer, card holder, associated vendor may be displayed on the front or back of the card. In some examples, the payment card may comprise a dual interface contactless payment card. In some embodiments, the contactless card is not related to a payment card, and may comprise, without limitation, an identification card, security card, loyalty card, smart card, and/or access card.

The contactless card may comprise a substrate, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card may have physical characteristics compliant with the ID-1 format of the ISO/IEC 7810 standard, and the contactless card may otherwise be compliant with the ISO/IEC 14443 standard. However, it is understood that embodiments of the contactless card according to the present disclosure may have different characteristics, and the present disclosure does not require a contactless card to be implemented in a payment card.

Figure 3:
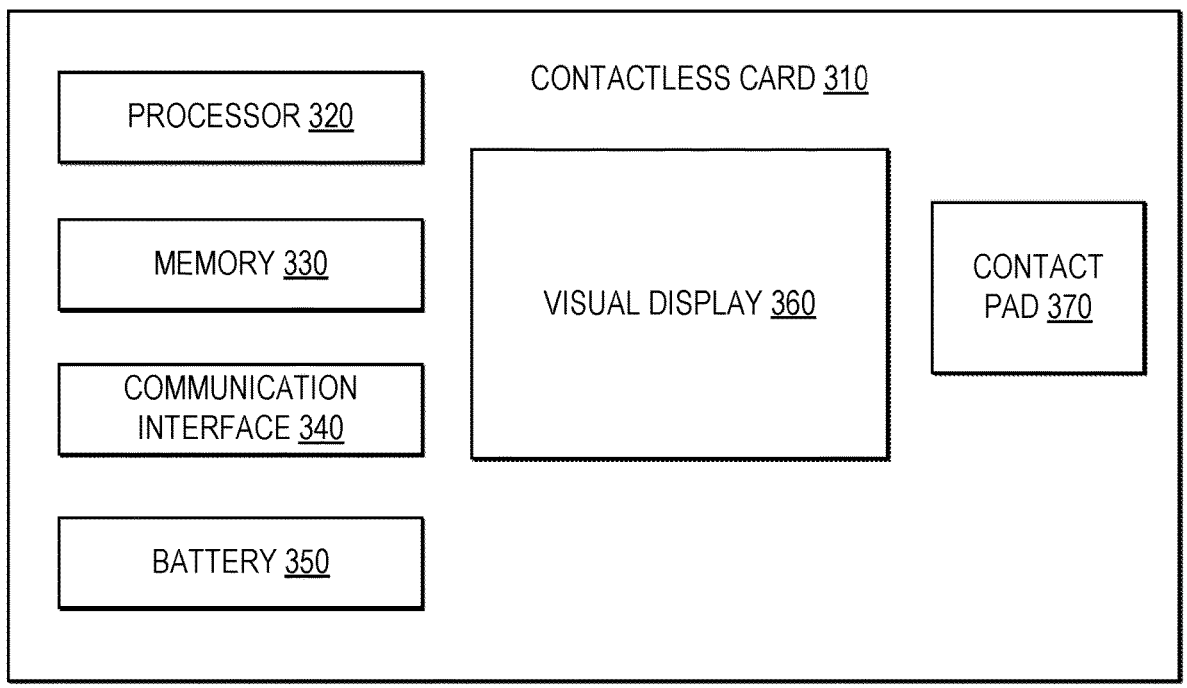
FIG. 3 illustrates a contactless card according to an example embodiment.

FIG. 3 illustrates an example embodiment of a contactless card. As shown in FIG. 3, contactless card 310 comprises a processor 320, memory 330, communication interface 340, battery 350, visual display 360 and contact pad 370.

In some embodiments, the contactless card may also include a magnetic strip or tape, which may be located on the back of the card (not shown). It is understood that certain embodiments of the contactless card may contain additional components, including processors, memories, error and parity/CRC checkers, data encoders, anti-collision algorithms, controllers, command decoders, security primitives and tamper-proofing hardware, as necessary to perform the various functions described herein.

In some embodiments, the memory may be a read-only memory, write-once read-multiple memory or read/write memory, e.g., RAM, ROM, and EEPROM, and the contactless card may include one or more of these memories or combinations of these memories. A read-only memory may be factory programmable as read-only or one-time programmable. One-time programmability provides the opportunity to write once then read many times. A write once/read-multiple memory may be programmed at a point in time after the memory chip has left the factory. Once the write once memory is programmed, it may not be rewritten, but it may be read many times. A read/write memory may be programmed and re-programmed many times after leaving the factory. It may also be read many times. Memory may be volatile or non-volatile. It will be understood that in embodiment with volatile memory, a power source, such as battery may be connected to supply power to the memory.

The memory may be configured to store one or more applets, one or more counters, and/or a customer identifier. The one or more applets may comprise one or more software applications configured to execute on one or more contactless cards, such as Java Card applet. However, it is understood that applets are not limited to Java Card applets, and instead may be any software application operable on contactless cards or other devices having limited memory.

Applets may be added to contactless cards to provide a one-time password (OTP) for multifactor authentication (MFA) in various mobile application-based use cases. Applets may be configured to respond to one or more requests, such as near field data exchange (NDEF) requests, from a reader, such as a mobile NFC reader, and produce an NDEF message that comprises a cryptographically secure OTP encoded as an NDEF text tag.

The one or more counters may comprise a numeric counter sufficient to store an integer. The customer identifier may comprise a unique alphanumeric identifier assigned to a user of the contactless card, and the identifier may distinguish the user of the contactless card from other contactless card users. In some examples, the customer identifier may identify a customer, an account, and/or a profile assigned to that customer and may further identify the contactless card associated with the customer, account, and/or profile.

Some exemplary embodiments of the contactless card comprise a battery. In some embodiments, the battery may be rechargeable. The battery is electrically connected to the processor. In embodiments of the contactless card with a battery, the battery may supply power to the processor, memory, communication interface, and any other components of the contactless card.

Some embodiments of the contactless card may also include identification information displayed on the front and/or back of the card, and/or a contact pad. The contact pad may be configured to establish contact communication with a secondary device equipped with a corresponding card reader.

Some embodiments of the contactless card comprise a visual display. The visual display may be any form of display that presents visual information to the user including, but not limited to e-paper, e-ink, LCD display, LED indicators, and/or an LED display. The visual display may be in data communication with the processor and configured to provide information to the user over many applications. In some embodiments, the visual display may be configured to inform the user when the card has entered or been removed from the NFC field of secondary device. In some embodiments, the visual display may display a card number, expiration date, user name, and/or other information associated with a financial card.

Figure 4:
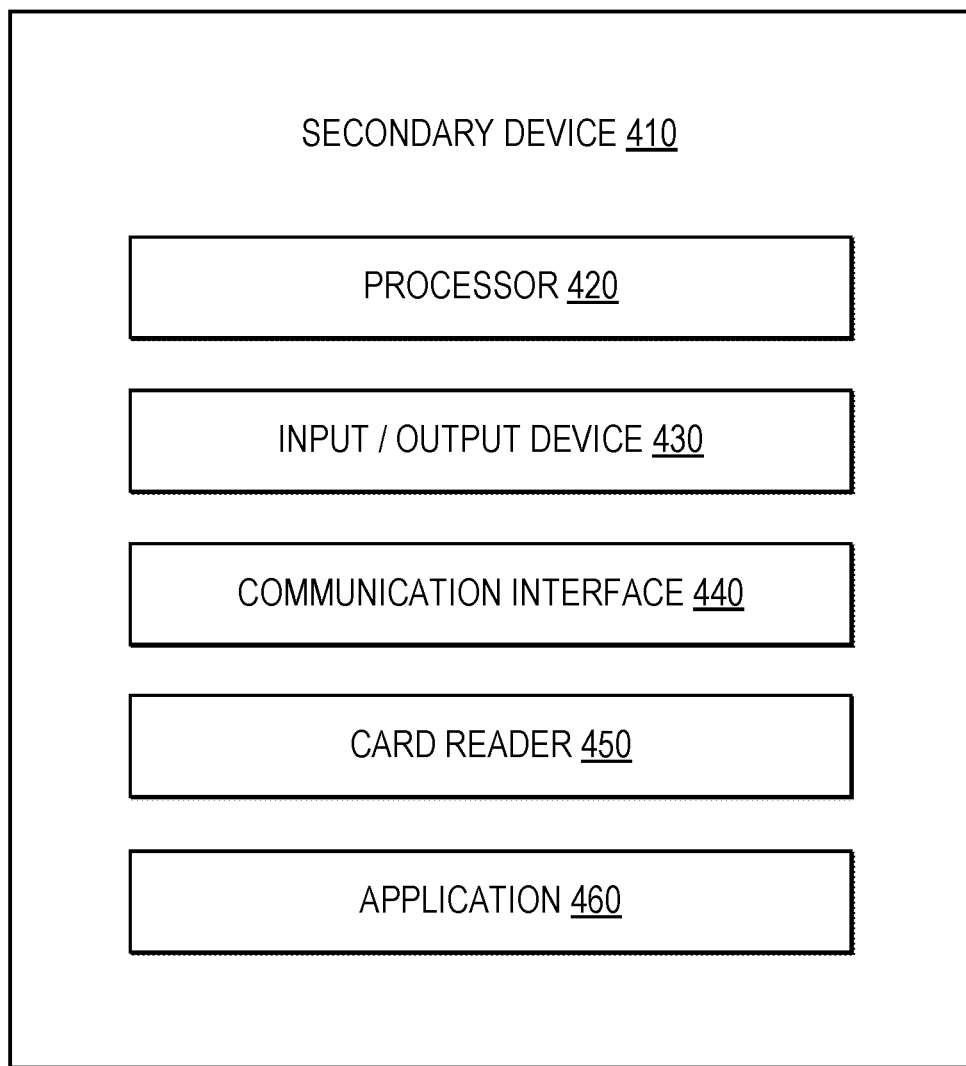
FIG. 4 illustrates a secondary device according to an example embodiment.

FIG. 4 illustrates an example embodiment of a secondary device. As shown in FIG. 4, in some embodiments secondary device 410 includes a processor 420, input/output device 430, communication interface 440, card reader 450, and application 460. In the example embodiments, secondary device 410 may execute one or more applications 460. For example, one or more applications 460, such as software applications, may be configured to enable, for example, network communications with one or more components of the disclosed system and transmit and/or receive data. Card reader 450 may be configured to read from and/or communicate with a contactless card.

The application of any of secondary device may communicate with the contactless card using short-range wireless communication (e.g., NFC, Bluetooth, and/or Bluetooth LE). The application may be configured to interface with a card reader of secondary device configured to communicate with a contactless card. Those skilled in the art would understand that a distance of less than twenty centimeters is consistent with NFC range. Additionally, signals may be limited to a range of less than about twenty centimeters by adjusting the power output associated with the communication interface.

The contactless cards may be built on a software platform operable on smart cards or other devices having limited memory, such as JavaCard, and one or more or more applications or applets may be securely executed. Applets may be stored in memory to provide increased functionality. Applets may be configured to respond to one or more requests, from a secondary device or card reader, such as a NFC reader, and produce an NDEF message that comprises a cryptographically secure OTP encoded as an NDEF text tag. It will be understood that other cryptographically secure methods of communication may be utilized. In some embodiments, the level of cryptography may be related to the sensitivity of the information transmitted by the contactless card. In some embodiments, accommodation information may be encrypted in the public key of a requesting device. In some embodiments, accommodation information may be signed or authenticated by a private key associated with the contactless card. In such embodiments, the private key may indicate to the secondary device that the accommodation is genuine and may be trusted.

In some embodiments, the communication interface of a contactless card may be configured to establish two-way communication with the secondary device. Communication may be established using any known frequencies, methods, or techniques including NFC and/or Bluetooth Signals.

In some embodiments, the contactless card is a payment card associated with a profile. In such embodiments, the contactless card may comprise information associated with the profile including, but not limited to, account number, user name, expiration date, and/or card verification value. This information may be presented visually on the card itself, be embossed on the card, be displayed by a visual display, be encoded on a magnetic strip, and/or be stored in the memory of the card. Disclosed embodiments of the contactless card also contain accommodation information.

In some example embodiments, accommodation information includes but is not limited to, medical data, information related to a disability, handicap, and/or impairment, and/or information related to user vision, hearing, user mobility, height, movement patterns, prosthetics, and/or mobility devices. In some embodiments, accommodation information may also include, but is not limited to information related to secondary device settings, configuration, operation, and/or orientation.

In one exemplary use a user with limited vision wishes to use an ATM. The ATM is equipped with a contactless communication interface. The user positions the contactless card within an NFC field generated by the ATM. The communication interface of the contactless card transmits accommodation information to the ATM. In some embodiments, the accommodation information is converted into an accommodation message and the accommodation message is transmitted to the secondary device. Upon receiving the accommodation message, the secondary device performs an accommodation action. In this exemplary embodiment, the accommodation message instructs the ATM to perform the accommodation action of increasing the brightness, contrast, and font size on the ATM display. Once the brightness, contrast, and font size have been adjusted on the ATM display, the user with limited vision is able to use the ATM.

In one exemplary use, a hearing impaired user wishes to use an kiosk. The kiosk is equipped with a contactless communication interface. The user positions the contactless card within an NFC field generated by the kiosk. The communication interface of the contactless card transmits accommodation information to the kiosk. In some embodiments, the accommodation information is converted into an accommodation message and the accommodation message is transmitted to the secondary device. Upon receiving the accommodation message, the secondary device performs an accommodation action. In this exemplary embodiment, the accommodation message instructs the kiosk to present a teletype (TTY), telecommunications device for the deaf (TDD), or text telephone (TT) to the user. These accommodation devices allow the hearing impaired user to transmit messages using a keyboard and receive messages using a display screen. In some embodiments, the kiosk may comprise a display screen and present communications on the display screen automatically in addition to communicating the messages audibly using a speaker. In some embodiments, the kiosk uses a text-to-speech program in order to translate spoken communications into a written message displayed on the display screen. In some embodiments, upon receiving the accommodation message, the kiosk may contact a relay service which provides a human operator to translate communications from a written format to an audible format and vice versa. It will be appreciated that the terms "teletype," "telecommunications device for the deaf," and "text telephone" may be used interchangeably.

In some embodiments, the contactless card transmits an accommodation message which instructs a secondary device to perform the accommodation action of activating voice comments. Once the voice commands are activated, the user may be able to utilize the secondary device however, the initial step of activating the voice commands often requires the use of a conventional input/output device associated with the secondary device. By allowing the user to instruct the secondary device to adjust its settings in a desired fashion by positioning a contactless card in the NFC field associated with a device, users who would otherwise be unable to activate the accessibility features may be able to utilize the secondary device more completely.

In some embodiments, the contactless card requests an authentication certificate from the secondary device prior to transmitting accommodation information. In some embodiments, the contactless card modifies what accommodation information is transmitted based on the authentication certificated received. For example, if a contactless card requests an authentication certificate and receives one indicating a secondary device with a lower degree of trust, the contactless card may only transmit instructions to modify the configuration of the secondary device. In some embodiments, the authentication certificate may indicate a higher degree of trust, in which case, the contactless card may transmit accommodation information including the user's medical data or other sensitive information.

In some embodiments a public key and/or certificate chain may be used in order to establish a degree of trust between a contactless card and a secondary device. Additionally, the use of a certificate chain may allow a single institution to institute multiple secondary devices, each of which is identified as originating with a particular trusted institution. For example, a contactless card could be configured to trust all ATMs from a particular bank rather than identifying which individual ATMs the contactless card trusts. In some embodiments, a contactless card may be configured to trust any secondary device which has been certified by a certain third party. In such examples, a certifying organization may be able to inspect secondary devices. The secondary device may be configured to transmit an authentication certificate indicating that the device has been inspected by the certifying organization and therefor, is trustworthy.

In some embodiments, a user positions the contactless card within an NFC field associated with a mobile device. The contactless card may transmit accommodation information which instructs the mobile device to autofill a form. In some embodiments, the transmitted accommodation in formation may include the user's personal and/or financial data, thereby allowing the mobile device to autofill a payment form. In exemplary embodiments, this information could include the user's credit card number, expiration date, security code, pin number, password, and/or address. By allowing a user to autofill payment information, a user with limited vision, limited mobility, and/or tremors may be able to more easily make purchases and otherwise utilize the mobile device.

In some embodiments, a contactless card positioned within the NFC field of a mobile device may transmit a universal resource locator (URL) which instructs the phone to activate accessibility features such as, for example, turning up the volume and/or activating voice commands. In some embodiments, the transmitted information and/or URL instruct the secondary device to perform a routine action such as, for example, turn up the volume three increments. In such embodiments, the user may be able to adjust a secondary device in a granular manner by repeatedly bringing a contactless card into the NFC field of a secondary device.

In some embodiments, the contactless card generates and transmits a URL which deep links to a particular feature of a secondary device, such as a mobile device. The deep link URL may, for example, open a navigation or settings window which typically requires multiple navigation steps to access.

In one exemplary embodiment, a user may position a contactless card within the NFC field of a mobile device. The contactless card may transmit a URL which deep links to the brightness control setting on the mobile device. The user may then be able to directly adjust the brightness setting of the mobile device rather than navigating through several distinct steps before accessing the brightness controls.

In some embodiments, the secondary device confirms that the user is satisfied with the adjustment made based on the transmitted accommodation information. If the user is satisfied, the secondary device may record this information. If the user is not satisfied, the secondary device may make further adjustments to increase the user's satisfaction. In some embodiments, the secondary device records the additional adjustments and responds to the accommodation information accordingly in the future. In embodiments in which the contactless card is configured for two-way communication, the secondary device may transmit updated accommodation information to the contactless card indicating the particular accommodation the user indicated was satisfactory. A periodic feedback loop may be established which updates the accommodation information on the contactless card in order to adjust to the user's changing needs and/or preferences.

In some embodiments, the contactless card may be used at a point of sale and/or kiosk and transmit accommodation information associated with the user's age. If the contactless card requests an authentication certificate and receives a trusted certificate, the contactless card may transmit the user's birthday. If the contactless card receives a less trusted authentication certificate, the card may transmit information informing the secondary device that the user is over a certain age but not include the user's date of birth. For example, the contactless card may transmit information to a purchasing kiosk indicating that the user is over 21 years old without transmitting the user's date of birth. In such embodiments, the user may be allowed to purchase alcohol, tobacco, or other age restricted goods without a human operator checking the user's identification.

In some embodiments, the contactless card may be used to access a transportation system. In some embodiments, a user may position the contactless card within the NFC field of an entry and/or security kiosk. The contactless card may transmit information indicating the handicap, disability, and/or impairment of the user and the transportation system may respond by holding a door open for an extended period of time, lowering or eliminating a step, extending handles and/or railings, and/or sending a notification to a staff member.

In some embodiments, the secondary device may be a check-in kiosk at an airport tor hotel. In some embodiments, a user may position a contactless card within the NFC field of a check-in kiosk, the contactless card may transmit accommodation information to the kiosk. The kiosk may respond by, for example, notifying a staff member, ensuring that the user is provided with a wheelchair, and/or confirming with security personnel that the user has a genuine medical need for a wheelchair, prosthetic, or other device.

In some embodiments, the contactless card may be utilized with a mobile device to adjust the settings and/or configuration of the mobile device. Additionally or alternatively, the contactless card may be used to transmit information to applications executed on the mobile device. In one, non-limiting example, a user may position a contactless card within an NFC field of a mobile device. The contactless card may transmit information instructing the mobile device to activated various accessibility features. The user may then open a ride-share application on the mobile device. The contactless card may then inform the ride-share application that the user requires a wheel-chair accessible vehicle.

In some embodiments, the contactless card may transmit accommodation information to a secondary device when the user is not handicapped, disabled, or impaired in any way. In some embodiments, a user may utilize the contactless card in order to implement accommodation preferences rather than needs. If a user prefers to utilize voice commands rather than the standard input/output for a secondary device, the user may utilize a contactless card to activate the voice command features of a secondary device. In some embodiments, a user may prefer to adjust the color and or brightness settings of a device to a preferred setting including, for example, dimming the brightness and/or lowering the contrast of the device. It will be understood that any and/or all of the potential modifications discussed in the context of accommodation information may be utilized as a preference rather than a need. In such embodiments, the contactless card may be used to streamline the configuration of a secondary device rather than make a series of adjustments to the setting associated with the device.

Figure 5:
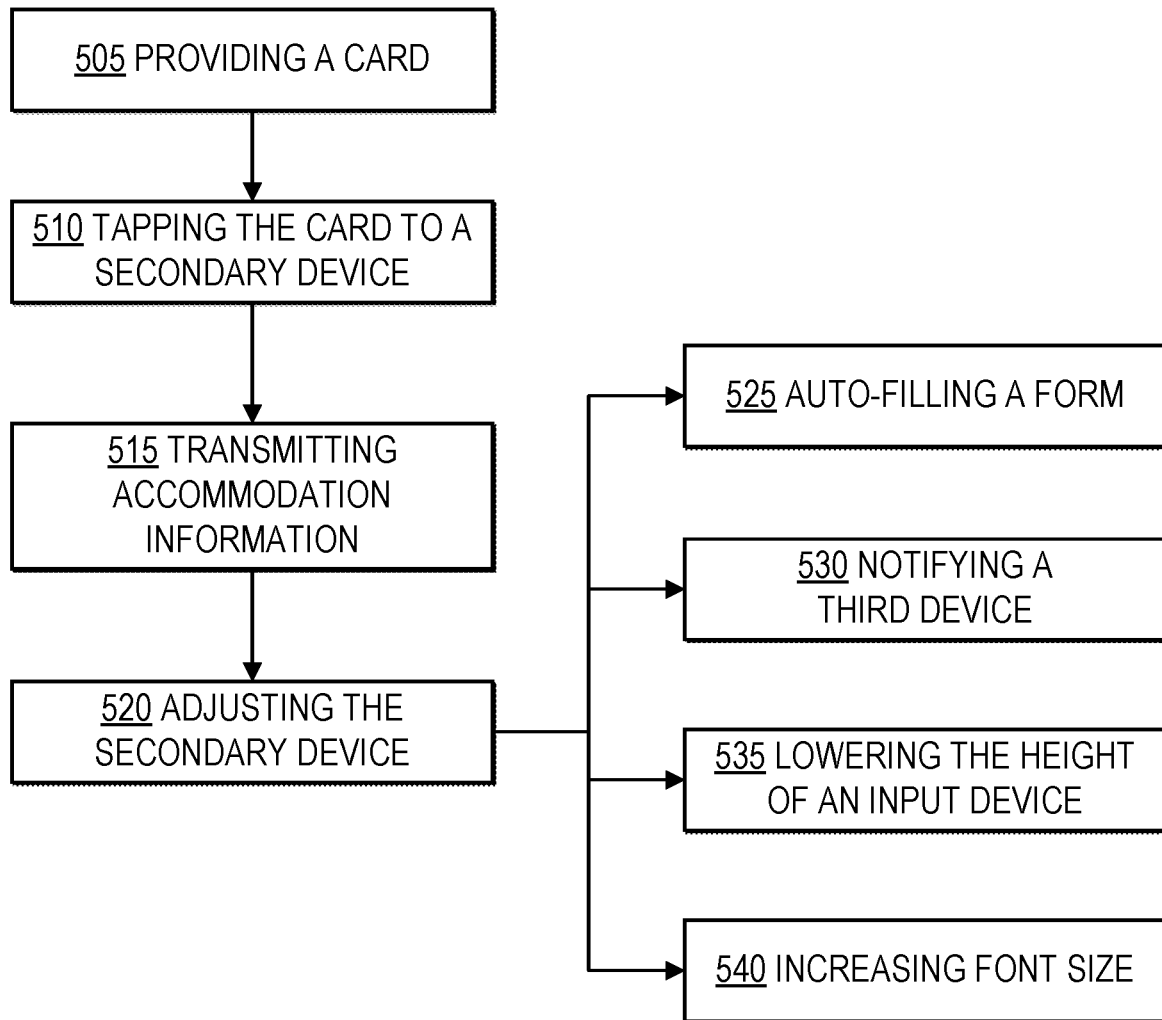
FIG. 5 illustrates a flow chart of a method for accommodating a user according to an example embodiment.

FIG. 5 is a flow chart illustrating the operation of an example embodiment of the disclosed accommodation system. Method 500 comprises, in step 505 providing a card comprising a processor, a memory containing accommodation information associated with a user's preferred accommodations, and a communication interface. It will be appreciated that the user's accommodation information is pre-loaded onto the card. Step 510 comprises tapping the card to a secondary device. When the card is tapped to a secondary device, the card will necessarily be positioned within wireless communication range of the secondary device such as, for example, within an NFC field. In step 515, the card transmits accommodation information from the card to the secondary device. The transmitted information may be stored in the memory of the card. In some embodiments, this step comprises generating a URL that deep links to a desired feature on the secondary device and transmitting that URL to the secondary device. Step 520 comprises adjusting the configuration of the secondary device in response to accommodation information transmitted from the card. In some embodiments, once the secondary device is adjusted in response to the accommodation information transmitted from the card, the user may then be better able to use or operate the secondary device without further assistance.

In some embodiments, the secondary device may take additional optional measure to better accommodate a user. In some embodiments, in step 525, the secondary device autofills a form in response to receiving the accommodation information. In some embodiments, Step 530 comprises the secondary device notifying a third device associated with a third party of a user's preferred accommodation. This may enable a system of devices or staff to assist a user and require only a single use of the contactless card by the user.

In some embodiments, the secondary device is an Automated Teller Machine (ATM) and step 535 comprises lowering the height of an ATM input device in response to the transmitted information.

In some embodiments, the secondary device is a mobile phone and step 540 comprises increasing the font size on the mobile phone in response to the transmitted information.

FIG. 6 is a flow chart illustrating the operation of an example embodiment of the disclosed accommodation system. Method 600 comprises, in step 605, providing a card comprising a processor, a memory containing accommodation information associated with a user's preferred accommodations, and a communication interface. Step 610 comprises tapping the card to a secondary device, thereby positioning the card within the NFC field of the secondary device. Prior to transmitting any accommodation information to the secondary device, in step 615, the card requests an authentication certificate form the secondary device. The authentication certificate received by the card may be used to determine a level of trust. Based on this level of trust and the authentication certificate of the secondary device, in step 620, the card selects accommodation information to transmit to the secondary device. As accommodation information may be sensitive, privacy techniques may be employed when transmitting the accommodation information. In step 625, the card limits the strength of the signal transmitting the accommodation information so that it may be received by the secondary device that is in close proximity to the card but not by other devices which may be attempting to eavesdrop on the transmission. Once the power of the transmission signal has been appropriately limited, in step 630, the card transmits accommodation information to the secondary device. Step 635 comprises, adjusting the secondary device in response to the transmitted accommodation information. The adjustments to the secondary may cover a wide variety of changes as discussed herein. For example, in step 640, the secondary device auto-fills a form. This saves the user from having to manually enter information into a form, such as, a web form. For users with limited mobility, this may allow the user to make purchase from an online store, enter the user's address or other contact information, or enter a password to log on to a particular account. In step 645, the secondary device notifies a third device. This may be useful for activating other additional support features which may not be immediately available from the secondary device. For example, if a user with limited mobility checks into a hotel kiosk using the disclosed contactless card, the hotel kiosk may send a notice to a front desk computer, indicating that the user will need wheel chair assistance or assistance moving luggage. In step 650, the secondary device lowers the height of an input device. Users who may have limited use of their arms or may use wheelchairs are not always able to reach an input device at a standard height. By lowering the input device, these users may be able to operate the secondary device in a conventional fashion. In some embodiments, the entire secondary device may be lowered rather than only the input device. In some embodiments, the secondary device may include a large touch screen and the input device may be virtually lowered by displaying the input device on a lower portion of the touch screen. In step 655, the secondary device increases a font size. By increasing the font size users who have limited vision but are not completely blind may be able to utilize the secondary device. In addition to increasing the font size, the secondary device may increase the brightness and/or contrast to increase the general readability of a display.

In some embodiments, the physical form factor of the contactless card is similar or the same as a traditional credit card. The contactless nature of the contactless card allows the card to be utilized without inserting the card into a traditional card reader. Accordingly, in some embodiments, the contactless card is not required to use the form factor of a traditional credit card. In some embodiments, the processor, memory, and communication interface may be incorporated into a pendant, designed to be worn on a lanyard, necklace, or bracelet. For users with limited mobility, tremors, or visual impairment, the act of removing a credit card from a wallet and determining that it is the correct credit card may present a challenge. By presenting the contactless card in a substantially different form factor, the user will have a tactile method of identifying the card and may not be required to manipulate a small and delicate object. In some embodiments, the user may be able to gesture with his wrist near a secondary device, thereby positioning a contactless pendant near the secondary device. In some embodiments, this allows the contactless pendant to transmit accommodation information and cause the secondary device to adjust accordingly.

In some embodiments, the contactless card may be presented in a form factor resembling a ball or other object that is easy for a user to hold. In some embodiments, the ball may be deformable, textured, or both. A deformable ball may allow a user with limited control of his hand to maintain a secure grip on the ball in order to gesture with the ball and associated communication interface near a secondary device. Similarly, a textured ball may improve the gripability of a contactless payment device which is presented as a ball. It will be understood that the contactless card may be presented in substantially any shape and it not limited to the form factor of a traditional credit card or a spherical ball. In some embodiments, the contactless card may be presented in a small generally cubic form factor, or an abstract shape configured to fit a user's hands, or a small shape designed to be worn around the user's neck or arm. Providing contactless payment cards in alternative form factors may allow users who are not able to utilize traditional payment cards to make transactions independently.

Throughout the specification, reference is made to accommodation information and accommodation messages. It will be understood that an accommodation message may include any portion of accommodation information in any format that may be utilized, directly or indirectly, but a secondary device. Accommodation information may include any data, information, table, chart, comma separated value, and/or file which contains information that may be used, directly or indirectly to communicate a needed or desired modification to a secondary device or the reason for such a needed or desired modification.

The present disclosure is not to be limited in terms of the particular embodiments described in this application, which are intended as illustrations of various aspects. Many modifications and variations can be made without departing from its spirit and scope, as may be apparent. Functionally equivalent methods and systems within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system comprising:
    a contactless card comprising a processor, a memory, and a contactless communication interface, wherein the memory contains an applet and physical accommodation information associated with one or more physical accommodations,
    wherein, after entry of the contactless card into a contactless communication field generated by a secondary device, the applet is configured to:
        request an authentication certificate from the secondary device via the contactless communication interface of the contactless card, wherein the authentication certificate includes a trust level, and
        upon receipt of the authentication certificate, generate an accommodation message based on the physical accommodation information and the trust level for transmission to the secondary device via a contactless communication interface of the secondary device,
    wherein, upon receipt of the accommodation message, the secondary device is configured to perform at least one accommodation action.

2. The system of claim 1, wherein:
    the secondary device includes one or more input/output devices selected from the group of a display screen, a speaker, a light source, a touch screen, imprinted characters, a microphone, a camera, a keyboard, a rollerball, or a button,
    the at least one accommodation action include one or more of adjusting at least one setting of the one or more input/output devices.

3. The system of claim 1, wherein adjusting at least one setting of the one or more input/output devices includes one or more of increasing a font size, increasing volume, increasing contrast, increasing brightness, adjusting color settings, activating a microphone, increasing button size, decreasing touch screen sensitivity, or adjusting touch screen input behavior.

4. The system of claim 1, wherein the physical accommodation information includes one or more of a desired font size, contrast settings, brightness settings, color setting, method of input, method of output, and the height of an input/output device.

5. The system of claim 1, wherein the contactless communication interfaces of the contactless card and the secondary device are near field communication (NFC) interfaces.

6. The system of claim 5, wherein the accommodation message is an NFC Data Exchange Format message.

7. The system of claim 1, wherein the secondary device is an Automatic Teller Machine (ATM), kiosk, computer, or mobile device.

8. The system of claim 7, wherein the secondary device is configured to activate voice commands upon receipt of the accommodation message.

9. The system of claim 1, wherein the secondary device is a public transit vehicle and the public transit vehicle is configured to increase a wait time upon receipt of the accommodation message.

10. The system of claim 1, wherein the secondary device is a check-in kiosk and the check-in kiosk notifies a third device associated with a third party upon receipt of the accommodation message.

11. The system of claim 1, wherein the memory further contains information associated with a user identity and financial information.

12. A method for implementing accommodations comprising:
    detecting, by a secondary device, entry of a card into a contactless communication field, wherein the card comprises a processor, a memory containing accommodation information associated with a user's preferred accommodations, and a communication interface;
    transmitting, by the secondary device, an authentication certificate including a trust level, to the card;
    receiving, by the secondary device, accommodation information from the card via the contactless communication field; and
    adjusting, by the secondary device, a configuration of the secondary device in response to the received accommodation information.

13. The method of claim 12, wherein the secondary device auto-fills a form in response to the received accommodation information.

14. The method of claim 12, wherein the secondary device notifies a third device associated with a third party of the received accommodation information.

15. The method of claim 12, wherein the card is configured to generate a URL deep linking to a desired feature on the secondary device and transmitting the URL to the secondary device.

16. The method of claim 12, wherein the secondary device is an Automated Teller Machine (ATM) and the ATM lowers the height of an input device in response to the received accommodation information.

17. The method of claim 12, wherein the secondary device is a mobile phone and the mobile phone increases a font size in response to the received accommodation information.

18. The method of claim 12, further comprising, the card requesting an authentication token from the secondary device and selecting accommodation information to transmit to the secondary device based on the received authentication token.

19. The method of claim 12, further comprising limiting the strength of a signal transmitted by the card in order to limit the range of the signal to a predetermined distance.

20. A contactless card comprising:
    a processor;
    a memory containing an applet and physical accommodation information;
    a contactless communication interface, wherein the contactless communication interface is configured to establish contactless communication with a secondary device that is configured to perform one or more accommodative actions, wherein, upon establishing contactless communication with the secondary device, the applet is configured to:
request an authentication certificate from the secondary device, wherein the authentication certificate includes a trust level, and
generate an accommodation message based on the physical accommodation information and the trust level for transmission to the secondary device via the contactless communication interface, and
wherein the applet is configured to encrypt the accommodation message prior to transmission to the secondary device.

\* \* \* \* \*